Jan. 11, 1966   W. R. WOOD   3,229,123
SQUIB SIMULATOR
Filed Sept. 21, 1961
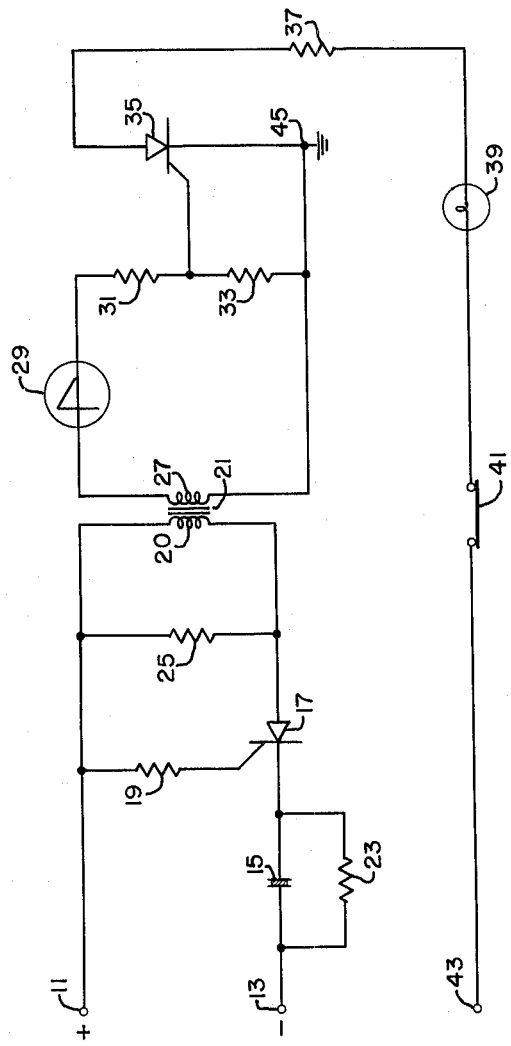
INVENTOR.
WARREN R. WOOD
BY *W. O. Duesenberry*
*D. E. Hodges*
ATTYS.

United States Patent Office 3,229,123
Patented Jan. 11, 1966

3,229,123
SQUIB SIMULATOR
Warren R. Wood, Palo Alto, Calif., assignor, by mesne assignments, to the United States of America as represented by the Secretary of the Navy
Filed Sept. 21, 1961, Ser. No. 139,813
2 Claims. (Cl. 307—108)

This invention relates to a squib simulator circuit, more particularly to a pulse forming circuit utilizing a resistance and a tantalum capacitor to simulate the electrical impulse used for firing a pyrotechnic squib.

In this invention the non-linear characteristic of a tantalum capacitor, is utilized to shape a current pulse similar to that of an electrically energized squib. The tantalum capacitor provides an equivalent circuit which differs from the equivalent circuit of a paper capacitor. Both types of capacitors have capacitance, series resistance and shunt resistance. The series resistance of the tantalum capacitor is higher than that of a corresponding paper capacitor and the shunt resistance of the tantalum capacitor is lower than that of the corresponding paper capacitor. The tantalum type capacitor also has an inductance effect which is negligible in the paper type capacitor. In the tantalum capacitor, chemical energy storage occurs which produces the effects of a battery in the capacitor circuit.

These non-linear effects in the capacitor circuit are used in this invention to provide a current pulse, the shape of which simulates the pulse shape used for firing a squib. In other words the circuitry of the instant invention provides a pulse shape similar to that developed in the electrical circuit of a pyrotechnic squib when such electrical circuit is energized and the squib is fired. Instead of the infinite rise time and the asymptotic decay time of a pulse produced by a normal R-C circuit, the current response of the R-C circuit having a tantalum capacitor provides a finite rise time, a rounded peak and a fast fall-off or delay time which is characteristic of the current pulse in the usual pyrotechnic squib circuit.

It is an object of this invention to employ a tantalum capacitor in an R-C circuit to provide a current impulse simulating that of a pyrotechnic squib circuit.

It is a further object of this invention to provide a simulated electrical squib current impulse.

Another object of this invention is to provide a squib simulating circuit in which the non-linear properties of a tantalum capacitor are employed.

Other objects and many of the attendant advantages of this invention will be readily appreciated as the same becomes better understood by reference to the following detailed description when considered in connection with the accompanying drawing wherein:

The drawing illustrates a squib simulating circuit employing a pulse shaping circuit having a tantalum capacitor.

Referring now to the drawing in which a preferred embodiment of a squib simulating circuit is illustrated, an input circuit includes terminals 11, 13, capacitor 15, silicon controlled rectifier 17, resistor 19, and primary winding 20 of transformer 21. A shunt resistor 23 is connected across capacitor 15 and a resistor 25 is connected across primary winding 21. Resistor 23 may have a resistance value of 100,000 ohms and resistor 25 may have a resistance value of 1 ohm or less.

An output circuit includes the secondary winding 27 of transformer 21, Shockley diode 29, resistors 31 and 33, silicon controlled rectifier 35, resistor 37, indicating lamp 39 and reset switch 41. A D.C. voltage is applied between positive terminal 43 and grounded terminal 45.

In operation, a D.C. voltage is first applied to input terminals 11 and 13. When this voltage is applied to the input circuit the silicon controlled rectifier 17 is gated through resistor 19, a 51 ohm resistor having been found to be satisfactory in a preferred embodiment of this invention. The capacitor 15 is then charged through resistor 25, drawing a current pulse of the amplitude and duration of that of a squib. That is, the current pulse shape drawn by the input circuit will be similar to that of the current drawn by an electrical pyrotechnic squib circuit. A voltage pulse will appear across primary winding 20 of transformer 21 and a voltage will appear across the secondary winding of transformer 21 which is proportional to the voltage across primary winding 20, the proportion being determined by the turns ratio of the windings of transformer 21. The Shockley diode 29 will conduct only when a voltage, for example 20 volts, is applied to the terminals thereof and it will be effectively an open circuit until such voltage is reached. When a voltage greater than 20 volts appears across the secondary winding 27, and hence across the terminals of diode 29, diode 29 will conduct. The conduction of diode 29 causes a voltage drop across resistor 33 which is applied to silicon controlled rectifier 35 causing conduction of current therethrough in the circuit including resistor 37 and lamp 39. Current flow through this circuit will be sufficient to cause lamp 39 to light. Current will flow through silicon controlled rectifier 35 and lamp 39 until the circuit is broken by the operation or relay or switch 41 to open position. Once the relay or switch is opened, it may again be closed to prepare for the next application of a voltage pulse from the secondary winding 27 of transformer 21. Relay or switch 41 may be reset after each simulated squib pulse is applied and the circuit will be ready for a new squib pulse. The circuit disclosed may be used repeatedly for the application of such simulated squib pulses.

Obviously many modifications and variations of the present invention are possible in the light of the above teachings. It is therefore to be understood, that within the scope of the appended claims, the invention may be practiced otherwise than as specifically described.

What is claimed as new and desired to be secured by Letters Patent of the United States is:

1. A squib simulating circuit for simulating the firing pulse developed in the electrical circuit of a squib including means for indicating the sufficiency thereof comprising a tantalum capacitor, a capacitor charging circuit including said capacitor, resistance means, and gating means interconnected to a pair of input terminals for causing said capacitor to be charged when a first D.C. voltage source is applied to said input terminals, a transformer having a primary winding and a secondary winding, means connecting said resistance means across said primary winding such that a charging voltage pulse appearing across said resistance means will be applied to said primary winding and by transformer action of said transformer to said secondary winding, an output circuit including said secondary winding and a voltage divider circuit serially connected to a Shockley diode, said diode adapted to conduct when a voltage greater than a threshold voltage is applied across said diode, said indicating means including an external circuit comprising a silicon controlled rectifier having a gating element, a lamp, and switch means connected serially between a positive terminal and a grounded terminal a second D.C. voltage source adapted to be connected across said positive terminal and said grounded terminal whereby a current may flow through said external circuit when said silicon controlled rectifier is gated, means connecting said gating element to said voltage divider circuit whereby said silicon controlled rectifier is gated when a voltage pulse appearing in the secondary winding of said transformer has sufficient magnitude to cause conduction through said diode and through said output circuit causing a current flow in said external circuit and causing said lamp to light whereby the sufficiency of said first D.C. voltage source to initiate a squib is indicated, said switching means adapted to break said external circuit and prepare said external circuit for conduction when a new voltage pulse is applied to said transformer.

2. A squib simulating circuit for simulating the firing pulse developed in the electrical circuit of a squib including means for indicating the sufficiency of said pulse comprising an input circuit, an output circuit and an external circuit, said input circuit including a tantalum capacitor having non-linear properties, a first resistor, a second resistor, a third resistor, a silicon controlled rectifier having a cathode, an anode, and a gating terminal, a pulse transformer having a primary winding and a secondary winding, a first input terminal, a second input terminal, said first resistor connected in parallel with the primary winding of said pulse transformer, said second resistor connected in parallel with said capacitor, said third resistor connected between said first terminal and said gating terminal, means serially connecting said first resistor, the cathode and anode of said silicon rectifier and said capacitor to said first and second terminals, said first and second input terminals being connectable to a first source of D.-C. voltage whereby a pulse simulating the firing pulse in the electrical circuit of a squib may be formed across said first resistor and across the primary winding of said transformer, said output circuit including the secondary winding of said pulse transformer, a fourth resistor, a fifth resistor and a diode serially interconnected, said diode being poled such that a reverse current will flow therethrough when a breakdown voltage is applied across said diode due to the application of said pulse to said pulse transformer causing a voltage to be developed across said fourth and fifth resistors, said external circuit including a silicon controlled rectifier means having gating terminal means, cathode means and anode means, current flow indicating means, means serially connecting said anode means, said cathode means and said current indicating means to a second source of D.-C. voltage whereby said external circuit may be energized, means connecting said gating terminal means to a juncture between said fourth and fifth resistors whereby said external circuit may be closed when said pulse is applied to said pulse transformer and current is caused to flow in said external circuit, which current flow is indicated by said indicating means.

References Cited by the Examiner

UNITED STATES PATENTS

| | | | |
|---|---|---|---|
| 2,677,799 | 5/1954 | Foster et al. | 320—1 |
| 2,906,962 | 9/1959 | Roth et al. | 307—108 |
| 3,060,350 | 10/1962 | Rywak | 317—148.55 |
| 3,161,759 | 12/1964 | Gambell et al. | 307—88.5 |

OTHER REFERENCES

Dixon, L. H., Jr., "Control Circuit Application of the Static Relays for Electronic Circuits," Ed. by R. F. Blake, pp. 135–141.

General Electric SCR Manual, 2nd Ed., General Electric Co., Rectifier Components Div., Auburn, New York, 1961, pp. 73 and 82.

ORIS L. RADER, *Primary Examiner.*

SAMUEL BERNSTEIN, *Examiner.*

A. SCHWARTZ, J. J. SWARTZ, *Assistant Examiners.*